Feb. 28, 1967 V. P. WEISMANN 3,305,991
REINFORCED MODULAR FOAM PANELS
Filed Dec. 14, 1964 4 Sheets-Sheet 1
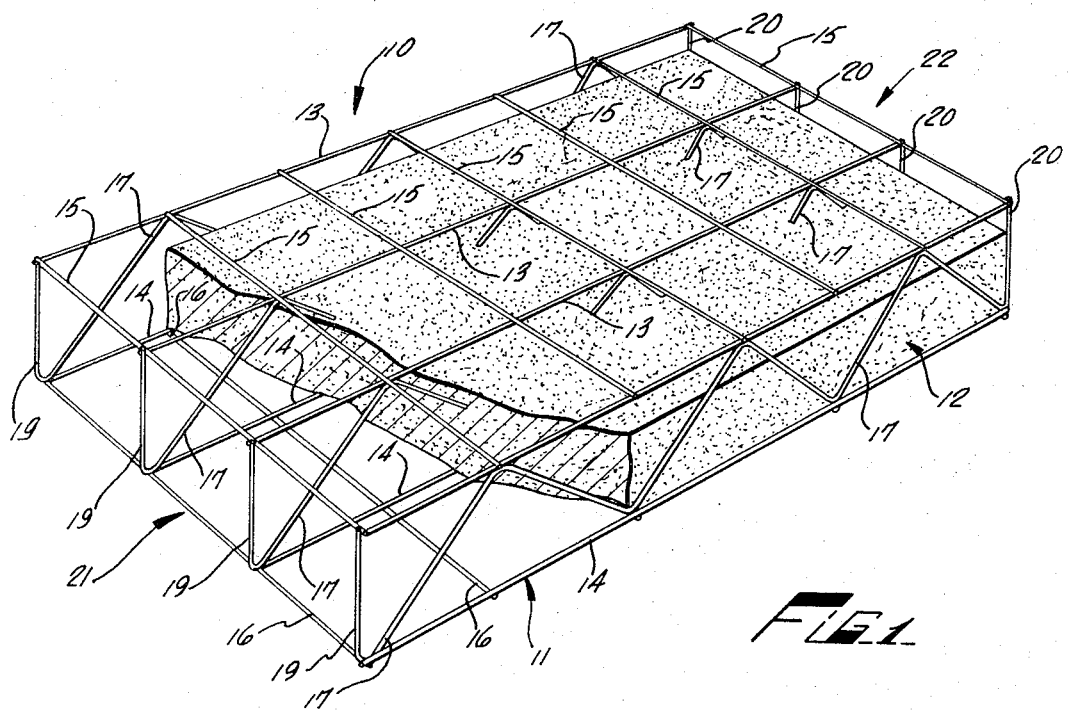
FIG. 1
FIG. 2
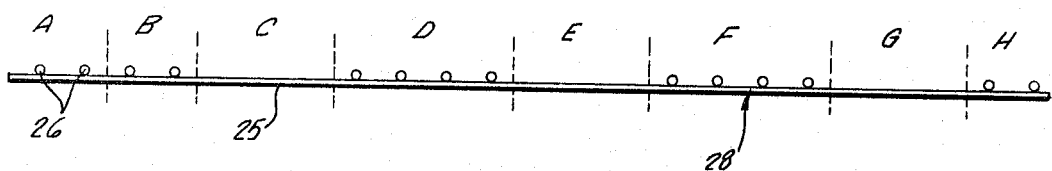
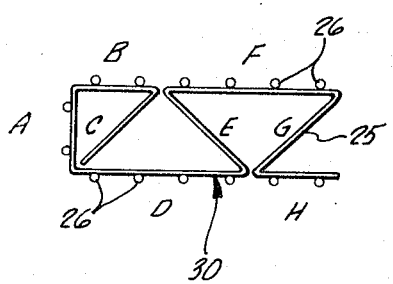
FIG. 3
INVENTOR.
VICTOR P. WEISMANN
BY
Christie Parker & Hale
ATTORNEYS.

Feb. 28, 1967  V. P. WEISMANN  3,305,991
REINFORCED MODULAR FOAM PANELS
Filed Dec. 14, 1964  4 Sheets-Sheet 2

INVENTOR.
VICTOR P. WEISMANN
BY
Christie Parker & Hale
ATTORNEYS.

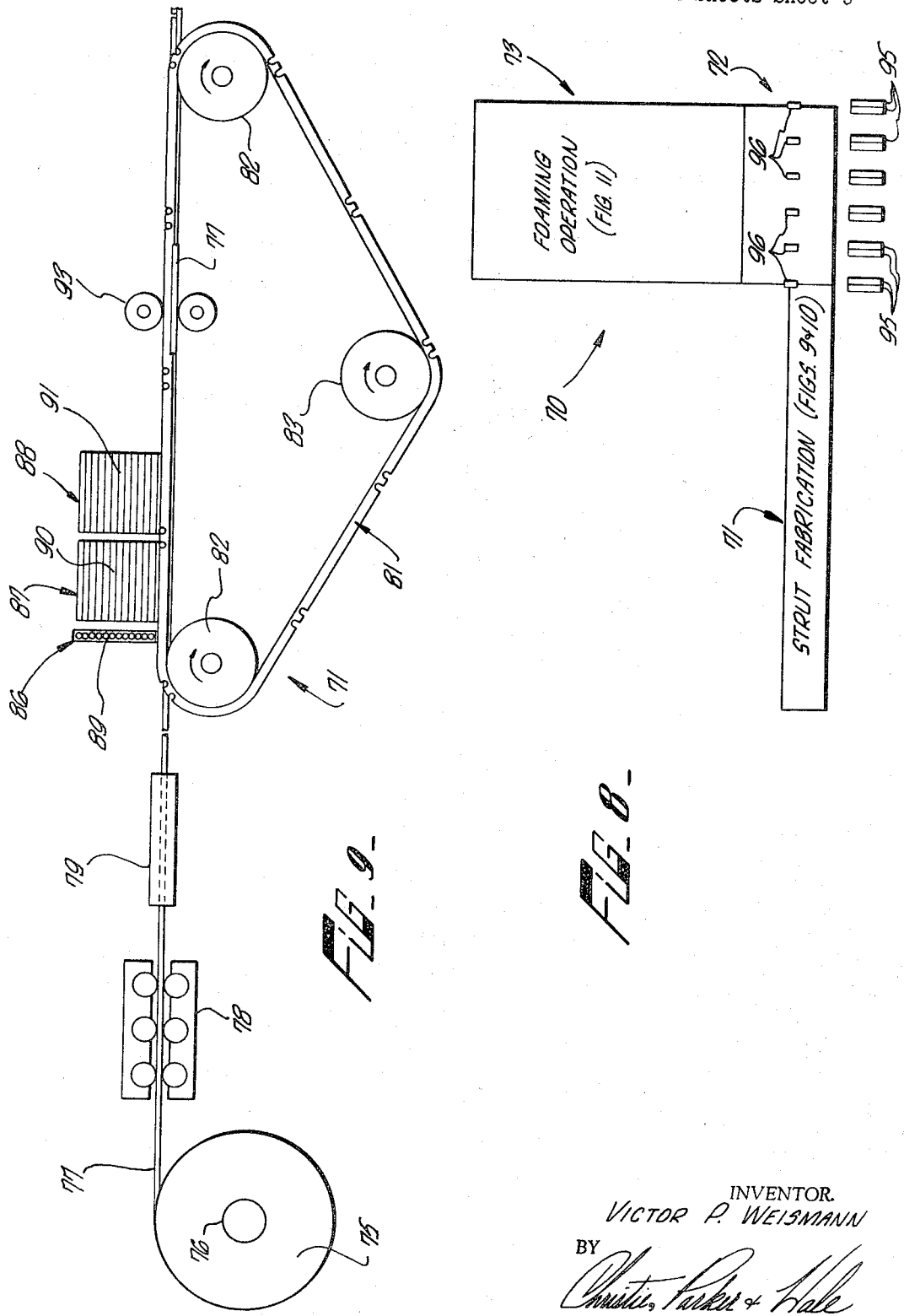

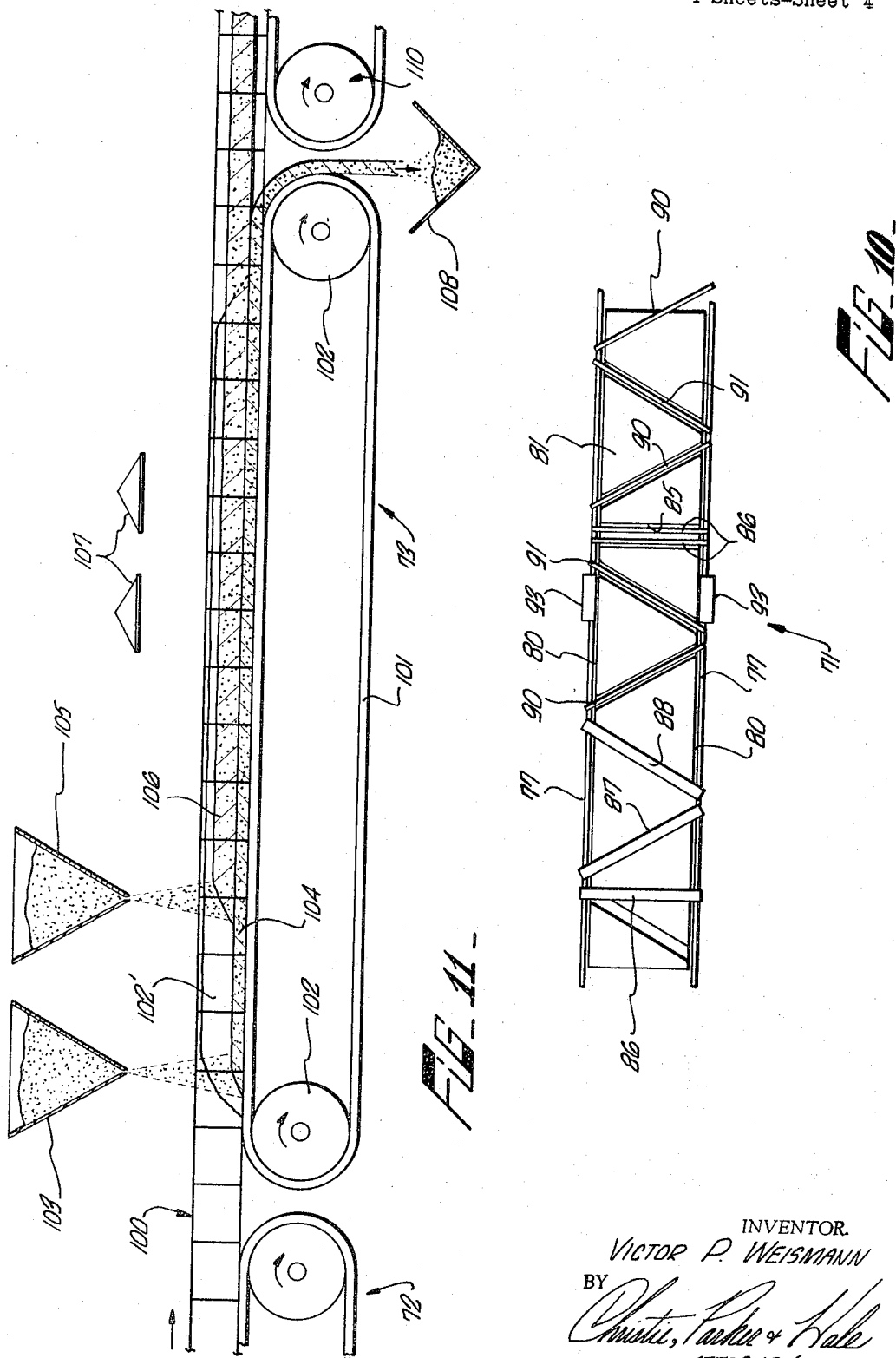

United States Patent Office 3,305,991
Patented Feb. 28, 1967

3,305,991
REINFORCED MODULAR FOAM PANELS
Victor P. Weismann, 430 Prospect Circle,
South Pasadena, Calif. 91030
Filed Dec. 14, 1964, Ser. No. 419,286
5 Claims. (Cl. 52—309)

This application is a continuation-in-part of my prior application Serial No. 140,504, filed September 25, 1961, now abandoned, for Modular Building Elements and Manufacture Thereof.

This invention relates to improvements in modular building panels and, more particularly, it relates to building panels fabricated at least in part from foam plastic material foamed or hardened in situ in a wire or light-gauge rod lattice.

In recent years, the development and utilization of rigid foamed materials in the building industry has increased. Such foams may take the form of foamed plaster, or they may appear as plastics such as foamed polystyrene or polyurethane foam. The plastic foams may be provided in the form of pellets which expand on the addition of heat, or they may be provided by mixing two constituents of the foam together to react to produce a foam which is allowed to set and harden. These plastic foams generally are unicellular in nature, i.e., the foam bubbles or voids are discrete and are not interconnected. Such unicellular foam materials exhibit excellent heat and sound insulation properties and are also impervious to moisture and, by virtue of these properties, are desirable as building materials.

To date the use of rigid unicellular plastic foams in the fabrication of habitable structures has been a composite affair. Sheets or blocks of foam are affixed to conventional skeleton portions of the building. For example, in a dwelling house the framework for the foam is provided by a 2 x 4 construction, and blocks of foam are inserted between the vertical studs of the wall to serve as insulation. Thereafter a layer of plastic is applied to the wall or panels of gypsum board which are nailed to the studs over the foam insulation. It is seen, however, that this is merely the use of a new insulation in association with conventional building procedures. The real economic savings possible through the use of unicellular plastic foams are ignored.

Recently, however, consideration has been given to a technique of building which utilizes the foam materials themselves as partition members where the partition wall is not required to sustain a substantial load. In these cases, a metal skin encloses relatively large blocks of the foam. The blocks or sheets are then installed as dividers, say, in a residence or office, and are then plastered over. The metal skin, however, is not a good base for a layer of plaster, and such panels have limited use because of their lack of structural strength.

Also, there have been attempts to use foam materials, particularly polystyrene foam, to produce structural members in buildings. In these cases, however, in order that the loads involved may be adequately supported, the thickness of the wall becomes inordinately large. Furthermore, if plumbing or electrical wiring is required in the area of the foam blocks, the utilization of plane blocks of foam renders the installation of such equipment difficult. The foam must be carved or cut away in the areas where the piping or wiring is to be installed. Because such techniques involve manual labor, the economic advantages inherent in the use of unicellular foam plastics are not fully realized.

This invention provides a modular building panel which utilizes expanded or foamed plastic materials as part of the structural unit in such a manner that the foam contributes significantly to the structural capacity of the panel. The economic advantages of the foam are realized to a much greater extent than previously. The panels minimize the amount of manual labor which must be expended in order that plumbing or electrical wiring may be installed in conjunction with the panels. Further, the panels are so light in weight as to be handled conveniently by one or two people, yet the panels need not be handled with any more care than presently used non-foam panels and may even be given rougher treatment without adverse effect. Additionally, this invention provides panels which are capable of withstanding considerable loads. The utilization of panels according to this invention expedites the construction time of structures by providing a sound base for plaster or the like.

This invention provides a method for fabricating a lightweight modular structural panel which has heat and sound insulating properties and is impervious to the passage of moisture therethrough. The method is carried out by first fabricating from slender elongated metal rods or wires a substantially cubical lattice defining, in skeletal form, side, end, top and bottom surfaces. The lattice also has internal braces extending across its interior between two opposite surfaces of the lattice, preferably the top and bottom surfaces. The method also includes supporting the lattice on a form surface which has an area at least as great as the area of the lattice. A layer of hard setting liquid foam plastic material is introduced into the supported lattice uniformly throughout the lattice around the braces. The method further includes hard-setting the foam plastic material in the lattice to provide a rigid mass of unicellular foam plastic which surrounds and bonds to the braces internally of the lattice. The foam plastic material preferably is heated during the hard setting operation.

This invention includes the method of foaming the material at a location remote from the lattice and then pouring the liquid foam into the lattice to harden and set up therein, and the method wherein a polyester resin and a blowing agent are combined during introduction into the lattice and the expanding process, at least in part, and the setting up process occur within the lattice.

The following description and explanation of the invention is made in conjunction with the accompanying drawing wherein:

FIG. 1 is a perspective view of a panel according to this invention;

FIG. 2 is an edge elevation view of a prefabricated planar framework from which the lattice is formed according to one method of fabricating the panel;

FIG. 3 is an elevational view of the prefabricated framework of FIG. 2 configured to form the lattice structure;

FIG. 8 is a schematic plan view of a preferred method for manufacturing panels according to this invention;

FIG. 9 is a side elevation view of a portion of the apparatus illustrated in FIG. 8;

FIG. 10 is a top plan view of the portion of the apparatus shown in FIG. 9; and

FIG. 11 is a side elevation view of another portion of the apparatus illustrated in FIG. 8.

Figure 4:
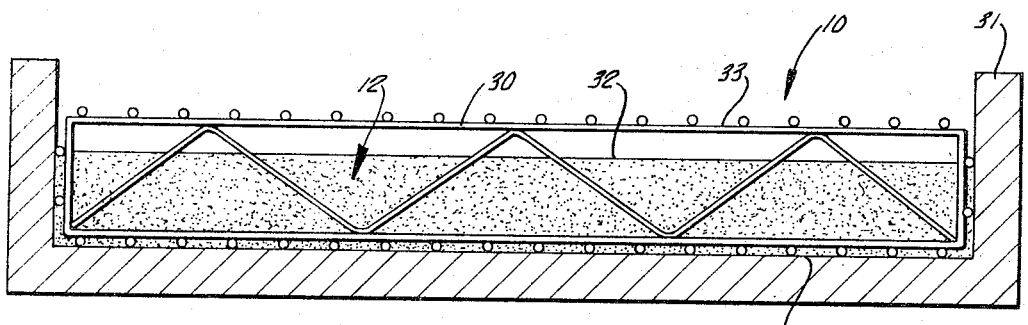
FIG. 4 illustrates one method of fabricating the panel when the foam extends to at least one side of the lattice.

As shown in FIGURE 1, a building panel 10 is comprised of a lattice 11 and a mass of foamed in situ unicellular plastic material 12. The lattice has a plurality of upper longitudinal spaced apart rod members 13, a plurality of parallel lower longitudinal spaced apart rod members 14, and a set of parallel upper and lower transverse rod members 15 and 16, respectively. Lattice members 13, 14, 15, and 16 preferably are slender elongated metal rods or wires welded rigidly to one another to form a three-dimensional rectilinear framework of generally cubical configuration. A plurality of zig-zag reversely bent strut rods or wires 17 are engaged between the oppositely disposed upper and lower longitudinal members between opposite ends 21 and 22 of the lattice 11. The struts extending into and traversing the interior of the lattice are secured to the junctions of upper members 13 and 15 intermediately and alternately of the junctions of lower members 14 and 16. End lattice members 19 and 20 are connected between the upper and lower longitudinal members 13 and 14 at ends 21 and 22 of the lattice, respectively. The outermost pair of struts and the end lattice members serve to enclose the lattice about its interior. It will be understood that struts 17 can be fabricated of separate elements as shown in FIG. 10.

As illustrated in FIGURE 1, the foamed plastic material of the panel extends from end 21 to end 22 and from side to side of the lattice. The foam lies against lower lattice members 14 and 16 and extends toward, but not to, upper members 13 and 15. The mass of plastic is hard-set in place to form a unitary mass which embeds and bonds to the struts to support the struts and the peripheral lattice elements 13, 14, 15, 16, 19, and 20, and to locate the mass relative to the lattice.

Lattice 11 is shown in FIG. 1 as being fabricated from rods of essentially the same diameter. It will be understood, however, that for economy of material the lattice may be fabricated from rods of varying sizes. In the panel as ultimately installed, members 13 and 14 are disposed vertically and hence are the principle compressive load bearing elements. These elements of the lattice may be fabricated from a heavier gauge rod than rods 15 and 16, for example, which provide local strength. Struts 17 may be fabricated from rods having a gauge intermediate the gauge of rods 13 and 14, and 15 and 16, respectively. It is preferred, however, regardless of whether the lattice is fabricated from rods of the same gauge or of different gauges that the rod gauge be between 8 and 16 gauge, inclusive. These sizes correspond to wire sizes and it is, therefore, apparent that the lattice is extremely light in weight. The lattice described is markedly dissimilar to a lattice fabricated of concrete reinforcing bar or the like. A lattice fabricated of reinforcing bar is clearly so heavy as to be extremely unwieldly when fabricated into panels of the same size as panels according to this invention.

FIGURE 2 illustrates a method of forming a lattice 11. The material of the lattice is initially provided in the form of a plurality of parallelly oriented longitudinal rod members 25 with a plurality of transverse rods 26 secured to the longitudinals 25 in grouped and spaced-apart locations. In FIGURE 2 the transverse lattice members 26 are grouped according to zones A, B, D, F, H, etc. with portions of the longitudinals void of transverse members 26 being denoted as zones C, E, G, etc. The members 25 and 26 provide a planar prefabricated framework. Zone A is bent downwardly at a right angle to zone B. Zone C is then bent backwardly at an angle of 135° to zone B with the portions of zone C adjacent zone D abutting the free end of zone A. Zone D is then bent back at an angle of 135° relative to zone C to lie parallel to zone B. Zone E is then bent back at an angle to zone D with zone F being bent at an angle to zone E so as to lie coplanar and adjacent the zone B. The prefabricated frame 28 is bent in such a fashion until the proper dimensions of the lattice are obtained. The knuckles or ends between zones A and C, B and F, D and H, etc., are then welded together to form the lattice desired. The lattice should be fabricated so that abutting zones D and H, for example, are coplanar. Since zones B, F, etc., and D, H, etc., are coplanar, being essentially continuous by virtue of the connections between these zones, the lattice alone is capable of withstanding considerable compressive loads.

In a lattice of this nature it is possible to provide sufficient cross-section in members 25 to withstand the compressive loads defined by building codes in the United States. The physical spacing of the members of the lattice and the dimensions of the elements of the lattice itself do not alone determine the load-bearing capacity of the panel. Considerable additional structural capacity of the unit 10 is provided by the presence of the unitary foam mass 12. Since the struts of the lattice 11 are embedded with and bonded to the unitary foam 12, which foam itself has considerable local compressive strength, the structural properties of the panel are far greater than those provided by the aggregate of the lattice and the foam considered separately. When the erected panel is subjected to a compressive load, both the longitudinals of the lattice and the foam material carry the compressive load. Also, the presence of the foam 12 provides lateral bracing of the lattice members such that the column strength of the lattice members is materially enhanced. The column strength of the struts exceeds that defined by Euler's column formula because the foam, being bonded to the struts, gives lateral support to the struts. The struts, therefore, are particularly effective in increasing the column strength of elements 13 and 14.

In manufacture of the panel, once the lattice has been fabricated, the foam plastic is foamed and hardened in situ. A form vat or tank 31 (see FIG. 4) having interior dimensions conforming generally to the external dimensions of a lattice 30 is provided. A predetermined quantity of the foam plastic material, corresponding to the level of the foam in the finished building panel, is then introduced uniformly into the form. The manner of foaming of the material 12 depends upon the material.

Several methods may be used in the in situ foaming and setting process. One method involves the incorporation of a blowing agent into a liquid resin or elastomer mixture which, upon heating, liberates a gas by a chemical reaction. Ammonium compounds and inorganic carbonates may be used as such blowing agents, but organic blowing agents result in gas production that can be better controlled by regulation of temperature. Also, organic blowing agents may be used in smaller quantities than inorganic blowing agents to produce equivalent volumes of gas. A second foaming method uses organic blowing agents which, when added to an unsaturated liquid polyester, forms a gas and also links the resulting foam into a flexible or rigid structure.

Polystyrene or polyurethane foams may be developed from a liquid state. The constituents of the foam may be introduced into the vat through a special mixing nozzle until the amount of the reacting constituents reaches the desired level. Such foaming processes, where the constituents are fluid and react upon intermixing, generate heat which cures or speeds the setting of the foam into rigid mass.

Foam can also be obtained from commercially available pellet of polystyrene. These pellets contain a blowing agent and expand upon the addition of heat. In such a case a closed form, equipped with steam or resistance heating coils to effect expansion of the pellets, must be provided; also the foam must ultimately fill the closed form if the foam is to be of uniform density. Preferably panels according to this invention have at least one surface of the foam mass located within the lattice, i.e., spaced inwardly from the structural elements of the lattice. For this reason, among others, the use of polystyrene pellets to provide the in situ foamed mass of panels according to this invention is not acceptable.

The preferred hard-setting foam plastic material from which the unitary rigid mass of unicellular plastic foam is obtained in panels according to this invention is polyurethane. Preferably the polyurethane foam, when hard-set into a rigid unitary mass, has a density of from about .96 to 1.20 lbs. per cubic feet, inclusive. Polyurethane foams unicellularly and is chemically inert and is exceedingly resistant to fire. Moreover, when properly foamed, polyurethane provides a skin over the exterior surfaces of the foam.

An advantage of panels fabricated according to this invention over those units known heretofore is that the foam has a "skin" on opposite sides of the foam mass. This skin, produced by the in situ foaming operation, enhances the moisture-sealing of the foam. If the hard-set foam of panel 10 were obtained from prefoamed blocks, there would be no "skin" available. Also, the use of a prefoamed block would not provide any bonding between the foam and the struts. As explained above, this bonding increases the column strength of the struts (and the struts in turn give column strength to rods 13 and 14, for example) and allows low diameter rods to be used safely. The "skins" along the surfaces 32 and 34 also enhance the heat insulation properties. These features are collateral with the normal physical properties of polyurethane plastic foam and result in an extremely efficient, safe, light-weight, easily handled, and economical building panel of size sufficient to materially reduce the costs of construction.

Figures 5, 6:
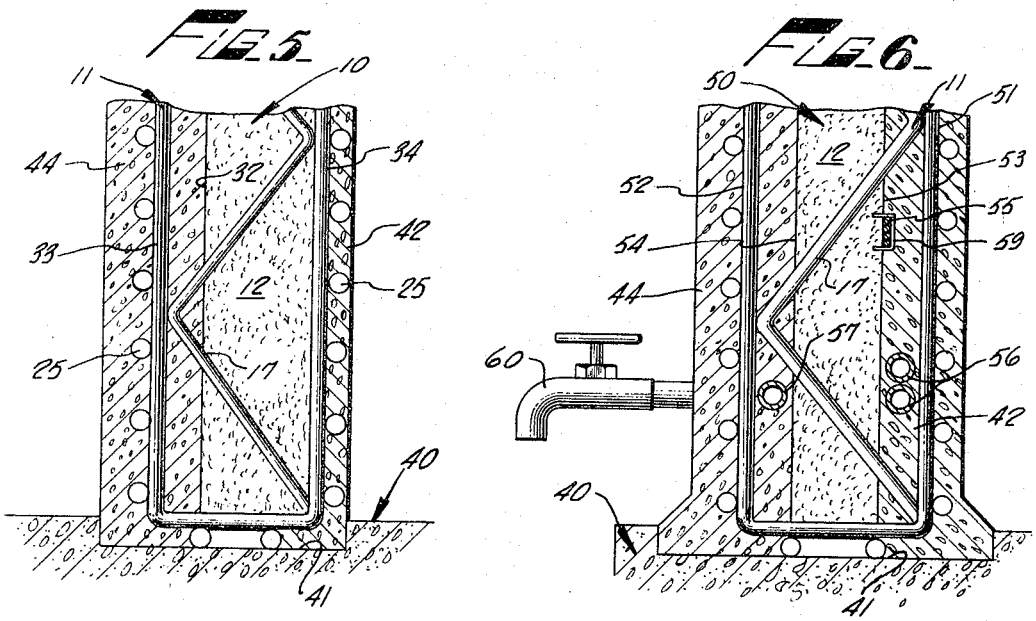
FIG. 5 is a fragmentary cross-sectional elevation view of the panel shown in FIG. 1 faced with plaster and gunite or stucco.
FIG. 6 is a fragmentary cross-sectional elevation view of a portion of another panel according to this invention with piping and electrical conduits installed between the foam and the adjacent vertical boundaries of the panel.
Figure 7:
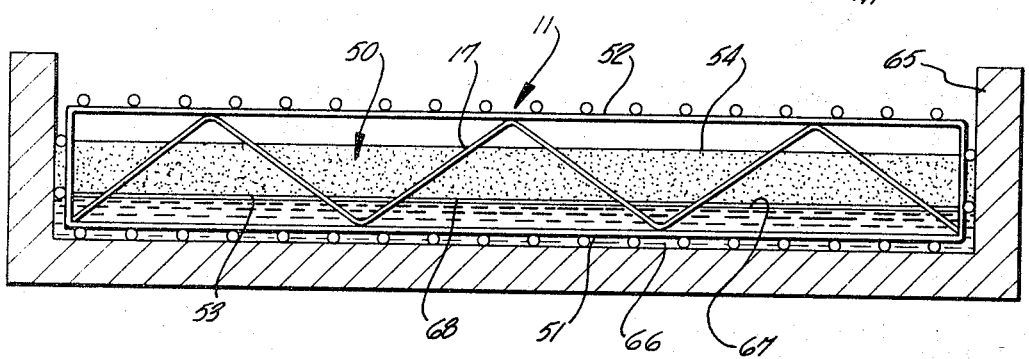
FIG. 7 illustrates a method of manufacturing the panel shown in FIG. 6.

In FIGURE 5 a panel 10 described previously is installed in a poured concrete slab foundation 40 fitted with a recess 41 adapted to receive the panel. The lower surface 34 of the panel shown in FIGURE 4, now the inner vertical surface of the installed unit, is plastered over as at 42. The transverse lattice members 25 are spaced externally of side 34 merely by subjecting foam 12 to heat and pressure after removal from form 31 to cause the unicellular structure of the body of the hard-set foam material to collapse into a non-cellular skin in the position illustrated in FIGURE 5, thus exposing the transverse members 25. The exposed transverse members 25 serve the function of conventional lath members and facilitate the application of a coat of plaster 42. A layer, or a series of layers, of gunite or stucco 44 is applied to the building unit 10 against the foam surface 32 to be retained by vertical lattice surface 33.

According to FIGURE 5, the building unit 10 is utilized as an exterior structural wall of a dwelling. However, by filling the lattice with foam to the inner surfaces of the transverse lattice members, the panel can be utilized conveniently as an interior wall or partition and is adaptable for application of plaster along both the vertical surfaces of the panel.

A panel may be formed with an opening to conveniently receive a window or door assembly by utilization of plugs or cores in form 31.

Panel 50 illustrated in FIGURE 6 has particular utility when used in an exterior structural wall of a building. The panel has a structural interior vertical side 51 and an exterior vertical side 52 spaced from the adjacent foam vertical surfaces 53 and 54, respectively. The spacing between the foam surfaces 53 and 54 and the vertical sides 51 and 52 of the lattice provides installation spaces for electrical and plumbing conduits 55, 56, and 57. As illustrated, electrical conduits or cables 55 are secured to the foam by wire clips or staples 59. Pipes 56 may be secured to the mass by clips similar to clips 59.

In FIGURE 6 plaster 42 is illustrated as extending completely to the vertical side 53 of the foamed mass. However, if desired, judicious spacing of the transverse lattice members will provide a sound base for plaster such that the space between lattice surface 51 and foam surface 53 may be void. A water pipe 57, embedded in gunite or stucco 44, is located between exterior lattice surface 52 and foam surface 54 and connects to an outdoor faucet 60.

The manufacture of panel 50 is somewhat different from the method of manufacture illustrated in FIGURE 4. Where both sides 53 and 54 of the foam are spaced from the adjacent sides of the lattice, a form 65, having a liquid 66 such as water therein, is utilized. The lattice is lowered into the liquid which is present in the form to a depth corresponding to the spacing between foam surface 53 and the adjacent lattice surface. When the empty lattice is so positioned in the form, a quantity of membrane-forming fluid is poured onto surface 67 of the water. This fluid spreads over the water within the form and polymerizes or coagulates to form a thin water barrier or membrane 68. When the membrane has formed, liquid foam material is added thereon. The reaction between the constituents of the liquid foaming material is exothermic and the heat developed in the reaction aids in the curing or setting-up of the foam. The amount of liquid foam material added is sufficient to bring the foam level to a predetermined point relative to the upper surface of the lattice. When the foam has set, the lattice and hard-set foam are lifted bodily from the form. Membrane 68 adheres to foam surface 53 and provides a particularly effective moisture barrier in the finished building panel.

FIGURE 8 shows, in schematic form, the arrangement of an automated apparatus for manufacturing panels 10 or 50 described above. Apparatus 70 includes a lattice sub-assembly fabrication mechanism 71 shown in greater detail in FIGURES 9 and 10. A lattice fabrication unit 72, wherein the lattice sub-assemblies are assembled into individual lattices or a continuous ribbon of lattices, is located adjacent the sub-assembly fabrication mechanism. Apparatus 70 also includes a foaming unit 73, more clearly illustrated in FIGURE 11, wherein foam is applied to the lattice and is hard-set to provide the finished panel.

The lattice sub-assembly fabrication unit 71 produces lattice components comprising a pair of lattice longitudinal elements 13 and 14 (see FIG. 1), end lattice elements 19 and 20, and the struts for these four units in the form of individual rod elements. A pair of reels 75 (only one of which is shown) are mounted on an axle 76 and carry wire 77 of the gauge desired for lattice elements 13 and 14. Wire 77 is drawn continuously from each reel and is passed through a group of straightening rollers 78 and into guides 79 from which the wires emerge spaced apart a distance corresponding to the distance between lattice members 13 and 14, for example. After the wires emerge from guides 79, they are passed along and parallel to the opposite edges 80 of a continuous belt 81 in the plane of the belt. The belt is engaged over a pair of spaced drive rollers 82 and a tensioning roller 83. The belt preferably is a rubber belt having substantial thickness.

As shown most clearly in FIGURE 10, the outer surface of the belt is configured to define a plurality of grooves which extend across the belt. These grooves include grooves 84 in which strut elements 90, 91 are disposed and which are inclined to the elongate extent of the belt in opposite directions alternately along the belt. If the belt has a total length equal to the length of the particular panel being fabricated, then a single wide groove 85 is formed in the surface of the belt and extends straight across the width of the belt. On the other hand, if the belt has a total length corresponding to some even multiple of the total length of the panel, then a plurality of grooves 85 are provided at locations spaced apart by a distance equal to the length of the panel.

Three rod hoppers 86, 87, and 88 are disposed above the belt adjacent the drive roller closest to guides 79. Hopper 86 is disposed perpendicular to the direction of belt movement and receives a supply of rods 89 which correspond to lattice end elements 19 and 20 (see FIG. 1). Hoppers 87 and 88 are disposed oblique to the direction of movement of the belt at the same angle as grooves 84 are oblique to the direction of belt movement. Hoppers 87 and 88 are angled in opposite directions as shown in FIG. 10 and each receive a supply of rod elements 90 and 91, respectively, which define the struts traversing the interior of the finished lattice. As the belt moves beneath hoppers 86, 87, and 88, the rods are fed from the hoppers into corresponding ones of grooves 84 and 85. Two rods are disposed in groove 85 as shown in FIG. 10.

Two pairs of welding wheels 93 are disposed along the edges of the belt between the hoppers and the other belt drive roller. The lower one of each pair of welding wheels continuously engages a respective wire 77, and the other wheel of each pair periodically engages the ends of rods 89, 90, or 91, which project beyond the edges of the belt, as the belt is moved. Rods 89, 90 and 91 are spot welded to wires 77 as they are engaged between the welding wheels. The belt is then withdrawn from between wires 77, and the thus formed ribbon of lattice sub-units is passed on to a shear (not shown) where wires 77 are severed between adjacent rods 86, thereby producing the desired lattice sub-assemblies.

As shown in FIG. 8, the lattice sub-assembly fabrication mechanism discharges lattice sub-assemblies into a lattice fabrication unit 72 which includes several pairs of wire reels 95. There are the same number of pairs of reels 95 as there are transverse elements 15 (see FIG. 1) in the finished lattice. While the details of unit 72 are not illustrated in the drawing, wire is fed from each pair of reels 95 across the upper and lower surfaces of a vertically oriented lattice sub-assembly. After a given sub-assembly has moved laterally a distance equal to the distance between adjacent elements 13 (see FIG. 1), another vertically oriented sub-assembly is inserted between the wires from reels 95. The sub-assemblies and the wires from reels 95 are welded together by spot welding units 96. It will be understood that the width of unit 72 corresponds to the length of the panels fabricated therein. It will also be understood that periodically a pair of closely spaced lattice sub-assemblies will be inserted between the wires from reels 95 for the same reason that two closely spaced rods 89 are periodically disposed on belt 81. The lattice fabrication unit thus discharges a "ribbon" 100 of interconnected lattice units. By passing the ribbon through a suitable shear or cutter, individual lattice units can be discharged sequentially from unit 72 if desired.

FIG. 11 illustrates how ribbon 100 is handled in foaming unit 73, although it will be understood that individual lattices can be handled by the same mechanism. As ribbon 100 emerges from unit 72, it passes onto a continuous belt 101 mounted for movement on a pair of spaced drive rollers 102. A belt 101 has a width no less than the width of ribbon 100. Preferably, however, the belt has a greater width than the width of the ribbon; the edges of the belt between drive rolls 102 are deflected upward by suitable deflectors (not shown) to provide sidewalls 102' of a form within which the plastic material is foamed. The upper surface of the belt defines the bottom of the form.

A sand hopper 103 is disposed above belt 101 adjacent left drive roller 102 (see FIG. 11) and extends transversely across the belt. As the belt moves below the hopper, a layer of sand 104 is laid down on the surface of the belt to a predetermined depth equal to the distance one surface of the foam mass in the finished panel is spaced inwardly from the adjacent side of the lattice.

A liquid foam dispenser 105 extends across the width of belt 101 adjacent the sand hopper and discharges onto sand layer 104 a layer of foam plastic material 106 of the desired depth. Layer 106 is either of the thickness corresponding to the thickness of the hard-set mass of foam material, or is of a thickness which when the material is fully expanded produces the desired thickness of foam material in the panel, depending upon the type of foaming action in the material. The belt then passes below a pair of banks 107 of infrared lamps and the foam plastic material is heated to expedite the hard-setting process.

By the time a given point on ribbon 100 approaches the belt drive roll disposed downstream of the infrared lamps, the foam material in the lattice is hard-set so as to embed and bond to the struts disposed across the interior of the lattice. As the belt passes over this latter drive roll, the sand carried by the belt is allowed to fall into a collecting bin 108 while the ribbon, now rendered rigid by the presence of the hard-set foam therein, is passed on to an additional conveyor 110. The sand which collects in hopper 108 is cleaned and reused in the foaming unit.

The methods of manufacture described in conjunction with FIGURES 4 and 7–10 are a considerable step forward over what has been known heretofore. Previously, any building units which used rigid reinforcing elements to strengthen and stiffen the foamed material required that the foam material be inserted in discrete blocks within such a lattice. The process of insertion of the block of foam into or relative to the foam of stiffening members was a time-consuming and costly procedure and did not produce a bond between the plastic foam and the lattice stiffening members. The methods of this invention, however, are extremely economical and fast and provide a building unit which is usable directly and that the economic and physical advantages of the foam material are fully realized.

In erecting a structure from panels provided by this invention, techniques may be used that are extremely simple. The panels are first aligned with each other with the edges abutting. Since the lattice members at the edges of the panels are either exposed or just barely covered by the foam material, adjacent panels may be wired or welded together by very simple and economical techniques. In such a manner the entire external and internal wall system of the building may be erected by one or two men in an extremely short time.

The advantages provided by panels 10 and 50 are manifold. Unicellular plastic foams of the types described above are chemically inert and are not prone to react with other materials adjacent thereto under conditions of heat or moisture. The foams are resistant to fire and pest action. The resistance to pests and insects is a particular feature in areas where termites annually cause millions of dollars of damage to buildings. The heat and sound insulation characteristics are apparent. Panels 10 and 50 are adaptable to myriad surfacing techniques and are extremely versatile.

It will be seen from the foregoing description that this invention provides an improved building panel and novel methods for fabricating the panel. The panel may be built at a location remote from the place where the panel is ultimately used. When the panel is to be installed either in an existing structure or in a new structure, it lends itself readily to economical construction techniques. These features are not present in panels incorporating foamed gypsum having sawdust fillers or the like, or foam plaster are used since such panels are extremely heavy. Moreover, panels according to this invention, because of the inherent resiliency of the foam plastic material provided therein, can be bowed or bent somewhat as they are handled without harmful effect to the panel. Cementitious materials, such as gypsum or plaster, are extremely brittle and, therefore, the lattices within which such materials are embedded must be exceedingly rigid so that the panels can withstand normal handling operations. Moreover, foamed or filled cementitious materials are not resistant to moisture permeation.

While the invention has been described above in conjunction with specific panels and methods of manufacture thereof, it is to be understood that this has been by way of describing certain presently preferred embodiments of the invention and is not intended as a limitation on the scope of this invention.

What is claimed is:

1. A prefabricated modular building panel as an article of manufacture comprising a plurality of slender elongated members rigidly secured together to define a three-dimensional rectilinear lattice having sides, ends, a pair of spaced apart major lateral surfaces and a plurality of strut members traversing the interior of the lattice and interconnecting the lattice lateral surfaces, and a unitary mass of rigid unicellular polyurethane foam disposed in the lattice and embedding and being bonded to the strut members and imparting lateral support thereto, the elongated members defining the spaced apart lattice lateral surfaces being substantially external of the mass of foam material, the foam material extending to the ends and sides of the lattice but not embedding the members at the sides of the lattice so that the panel is securable to a similar panel abutted thereagainst by interconnection of the members defining the abutting sides of the panels.

2. A prefabricated modular building panel as an article of manufacture comprising a plurality of slender elongated members rigidly secured together to define a three-dimensional rectilinear lattice having sides, ends, a pair of spaced apart major lateral surfaces and a plurality of strut members traversing the interior of the lattice and interconnecting the lattice lateral surfaces, and a unitary mass of rigid unicellular plastic foam material having a density of about 1.20 pounds per cubic foot or less disposed in the lattice and embedding and being bonded to the strut members and imparting lateral support thereto, the elongated members defining the spaced apart lattice lateral surfaces being substantially external of the mass of foam material, the mass of foam material defining a surface adjacent one of the lateral surfaces of the lattice and being spaced inwardly from said one surface, the foam material extending to the ends and sides of the lattice but not embedding the members at the sides of the lattice so that the panel is securable to a similar panel abutted thereagainst by interconnection of the members defining the abutting sides of the panels.

3. A prefabricated modular building panel as an article of manufacture comprising a plurality of slender elongated members rigidly secured together to define a three-dimensional rectilinear lattice having sides, ends, a pair of spaced apart major lateral surfaces and a plurality of strut members traversing the interior of the lattice and interconnecting the lattice lateral surfaces, and a unitary mass of rigid unicellular plastic foam material having a density of about 1.20 pounds per cubic foot or less disposed in the lattice and embedding and being bonded to the strut members and imparting lateral support thereto, the lattice lateral surfaces being external of and spaced from the mass of foam material, the foam material extending to the ends and sides of the lattice but not embedding the members at the sides of the lattice so that the panel is securable to a similar panel abutted thereagainst by interconnection of the members defining the abutting sides of the panels.

4. A prefabricated modular building panel as an article of manufacture comprising a three-dimensional rectangular lattice fabricated of slender elongated rods, the lattice including a first plurality of parallel spaced apart rods disposed in a plane, a corresponding second plurality of parallel spaced apart rods aligned with the rods of the first plurality to be parallel thereto and disposed in a common plane spaced from and parallel to the plane of the first plurality of rods, a third plurality of rods in each of said planes disposed transversely of the rods of the first and second pluralities and secured thereto, the rods of the first, second and third pluralities defining front and back surfaces of the lattice and a fourth plurality of rods extending back and forth between respective rods of the first and second pluralities and secured thereto adjacent alternate ones of the third plurality of rods in the respective planes for spacing the rods in the front and back surfaces from each other, and a unitary mass of unicellular water-impervious plastic foam material having a density of about 1.20 pounds per cubic foot or less disposed in the lattice and embedding and being bonded to the rods of the fourth plurality, the front and back surfaces of the lattice being disposed adjacent the exterior of the plastic foam material, the lattice having sides and ends and the foam material extending to the lattice sides and ends inside the lattice.

5. A prefabricated modular building panel as an article of manufacture comprising a plurality of slender elongated rod-like members rigidly secured together to define a three-dimensional rectilinear lattice having sides, ends, a pair of spaced apart surfaces and a plurality of strut members traversing the interior of the lattice and interconnecting the lattice surfaces, none of said rod-like members having a diameter greater than the diameter of 8 gauge wire, and a unitary mass of rigid unicellular plastic foam material, having a density in the range of from .96 to 1.20 pounds per cubic feet, inclusive, disposed in the lattice and embedding and being bonded to the strut members and imparting lateral support thereto, the elongated members defining the spaced apart lattice surfaces being substantially external of the mass of foam material, the foam material extending to the ends and sides of the lattice but not embedding the members at the sides of the lattice so that the panel is securable to a similar panel abutted thereagainst by interconnection of the members defining the abutting sides of the panels.

References Cited by the Examiner

UNITED STATES PATENTS

| | | | |
|---|---|---|---|
| 2,140,283 | 12/1938 | Faber | 52—378 |
| 2,368,047 | 1/1945 | Southwick | 140—112 |
| 2,540,349 | 2/1951 | Reed | 52—410 |
| 2,939,206 | 6/1960 | Keller | 29—155 |
| 3,003,199 | 10/1961 | Talmey | 52—309 |
| 3,010,493 | 11/1961 | Fingerhut | 140—112 |
| 3,093,935 | 6/1963 | Dunn | 52—309 |
| 3,150,032 | 9/1964 | Rubenstein | 161—161 |
| 3,158,925 | 12/1964 | Edge | 29—155 |

References Cited by the Applicant

UNITED STATES PATENTS

| | | |
|---|---|---|
| 2,063,309 | 12/1936 | Graef. |
| 2,262,899 | 11/1941 | Mechlin. |
| 2,268,251 | 12/1941 | Haux. |
| 2,744,042 | 5/1956 | Pace. |
| 2,975,488 | 3/1961 | Brauner. |
| 3,000,144 | 9/1961 | Kitson. |

FOREIGN PATENTS 866,388   4/1961   England.

FRANK L. ABBOTT, *Primary Examiner.*

JOHN E. MURTAGH, *Examiner.*